US008451632B2

(12) United States Patent
Yang et al.

(10) Patent No.: US 8,451,632 B2
(45) Date of Patent: May 28, 2013

(54) DUAL-SWITCHES FLYBACK POWER CONVERTER WITH SELF-EXCITED SUPPLY TO POWER THE HIGH-SIDE DRIVER

(75) Inventors: Ta-Yung Yang, Milpitas, CA (US); Ying-Chieh Su, Taipei County (TW); Jhih-Da Hsu, Taipei County (TW)

(73) Assignee: System General Corporation, Sindian, Taipei County (TW)

( * ) Notice: Subject to any disclaimer, the term of this patent is extended or adjusted under 35 U.S.C. 154(b) by 824 days.

(21) Appl. No.: 12/624,565

(22) Filed: Nov. 24, 2009

(65) Prior Publication Data

US 2010/0232182 A1 Sep. 16, 2010

Related U.S. Application Data

(60) Provisional application No. 61/210,112, filed on Mar. 12, 2009.

(51) Int. Cl.
*H02M 3/335* (2006.01)
*H02M 7/537* (2006.01)

(52) U.S. Cl.
USPC .......................... 363/21.12; 363/97; 363/131

(58) Field of Classification Search
USPC .................... 363/16, 17, 21.12, 21.13, 21.16, 363/97, 98, 131, 132
See application file for complete search history.

(56) References Cited

U.S. PATENT DOCUMENTS 4,030,024 A * 6/1977 Chambers et al. ............ 323/267
6,043,993 A * 3/2000 Kobori et al. .................. 363/17
7,460,380 B2 12/2008 Yang
7,522,430 B2 * 4/2009 Osaka ........................ 363/21.02
7,719,859 B2 * 5/2010 Nishikawa ...................... 363/17
7,839,666 B1 * 11/2010 Li ............................. 363/56.05

* cited by examiner

*Primary Examiner* — Matthew Nguyen
(74) *Attorney, Agent, or Firm* — McClure, Qualey & Rodack, LLP

(57) ABSTRACT

An exemplary embodiment of a flyback power converter includes a transformer for power transfer, a high-side transistor, a low-side transistor, two diodes, a control circuit, and a high-side drive circuit. The high-side transistor and the low-side transistor are coupled to switch the transformer. The two diodes are coupled to said transformer to circulate energy of leakage inductance of the transformer to an input power rail of the power converter. The control circuit generates a switching signal coupled to control the high-side transistor and the low-side transistor. The high-side drive circuit is coupled to receive the switching signal for driving the high-side transistor. The transformer has an auxiliary winding generating a floating power to provide power supply for said high-side drive circuit.

8 Claims, 3 Drawing Sheets

DUAL-SWITCHES FLYBACK POWER CONVERTER WITH SELF-EXCITED SUPPLY TO POWER THE HIGH-SIDE DRIVER

CROSS REFERENCE TO RELATED APPLICATIONS

The present application claims the benefit of U.S. provisional application entitled "Dual-Switches Flyback Power Converter with Self-Excited Supply to power the High-Side Driver", Ser. No. 61/210,112, filed Mar. 12, 2009.

BACKGROUND OF THE INVENTION

1. Field of the Invention

The invention relates to a flyback power converter, and more particularly to a dual switches flyback power converter to power a high-side driver.

2. Description of the Related Art

The dual switches flyback power converter is a high efficiency power converter. The leakage inductance's energy of the transformer can be retrieved to the power rail of the power converter. A prior art has been disclosed recently, it is "Highly efficient switching power converter using a charge pump to power the drive circuit" by Yang, U.S. Pat. No. 7,460,380. However, the drawback of this prior art is a limited maximum duty cycle. The charge pump is unable to power the high-side drive circuit when the duty cycle near to the 100%. The object of the present invention is to provide an approach to solve this problem.

BRIEF SUMMARY OF THE INVENTION

An exemplary embodiment of a flyback power converter comprises a transformer for power transfer, a high-side transistor, a low-side transistor, two diodes, a control circuit, and a high-side drive circuit. The high-side transistor and the low-side transistor are coupled to switch the transformer. The two diodes are coupled to said transformer to circulate energy of leakage inductance of the transformer to an input power rail of the power converter. The control circuit generates a switching signal coupled to control the high-side transistor and the low-side transistor. The high-side drive circuit is coupled to receive the switching signal for driving the high-side transistor. The transformer has an auxiliary winding generating a floating power to provide power supply for said high-side drive circuit.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
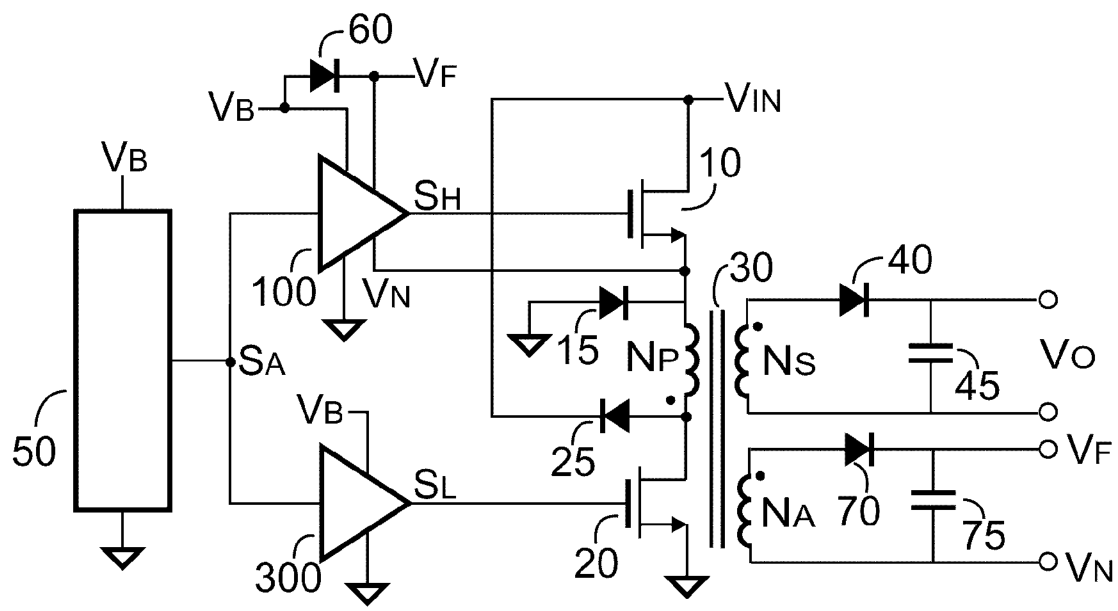
FIG. 1 shows an exemplary embodiment of a dual switches flyback power converter.

FIG. 1 is a dual switches flyback power converter in accordance with the present invention. A transformer 30 is used for power transfer. The transformer 30 has a primary winding $N_P$ and a secondary winding $N_S$. A high-side transistor 10 and a low-side transistor 20 are coupled to switch the transformer 30. A diode 25 is connected from one terminal of the primary winding $N_P$ of the transformer 30 to an input power rail $V_{IN}$ of the power converter. Another diode 15 is connected to the other terminal of the primary winding $N_P$ of the transformer 30. The diodes 15 and 25 are coupled to circulate the energy of the leakage inductance of the transformer 30 to the input power rail $V_{IN}$ when the transistors 10 and 20 are turned off. A rectifier 40 is connected to secondary winding $N_S$ of the transformer 30 for generating an output $V_O$ on a capacitor 45. A control circuit 50 generates a switching signal $S_A$ coupled to control the transistors 10 and 20. A high-side drive circuit 100 is coupled to receive the switching signal $S_A$ for driving the high-side transistor 10. A low-side drive circuit 300 receives the switching signal $S_A$ for driving the low-side transistor 20. The low-side drive circuit 300 will turn on the low-side transistor 20 before a power supply $V_B$ of the low-side drive circuit 300 reaches an operating threshold. The high-side transistor 10 and the low-side transistor 20 are turned on/off simultaneously after the power supply $V_B$ is higher than the operating threshold. The high-side drive circuit 100 is powered by the power supply $V_B$ and a floating power $V_F$-$V_N$. The floating power $V_F$-$V_N$ is connected to the high-side drive circuit 100 and the high-side transistor 10. The transformer 30 has an auxiliary winding $N_A$ generating the floating power $V_F$-$V_N$. A floating capacitor 75 is used for generating the floating power $V_F$-$V_N$. A floating diode 70 is coupled from the auxiliary winding $N_A$ of the transformer 30 to the floating capacitor 75 for rectifying. Furthermore, a bootstrap diode 60 is coupled from the power supply $V_B$ to the floating capacitor 75 for charging the floating capacitor 75 during a power on period.

Figure 2:
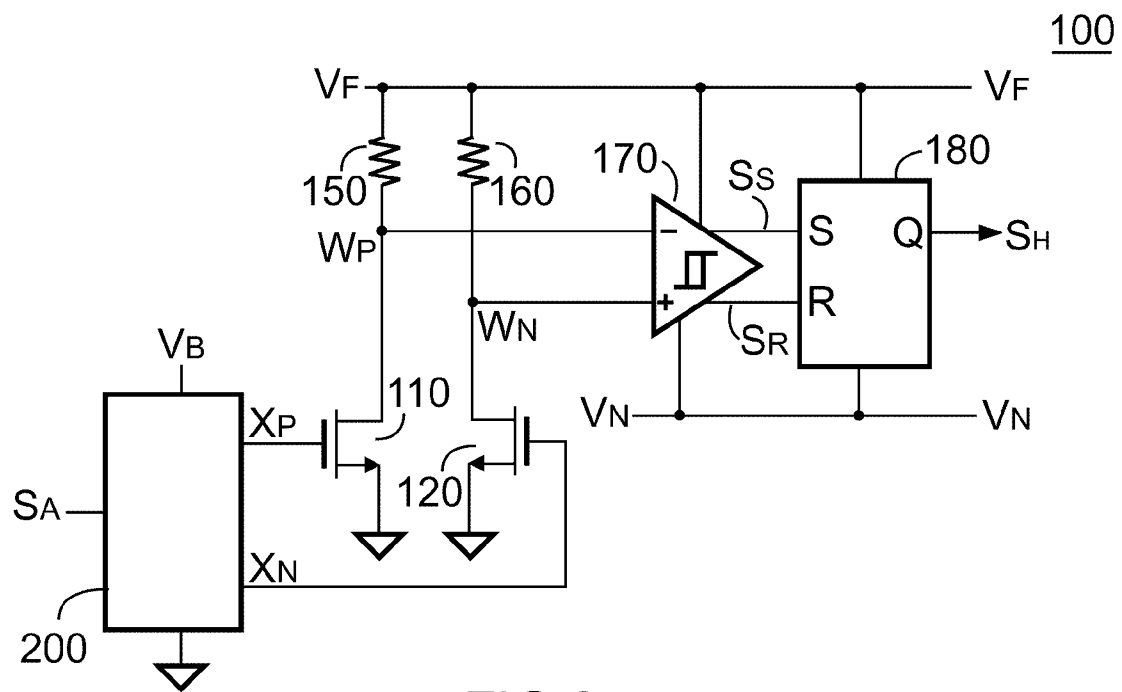
FIG. 2 shows an exemplary embodiment of the high-side drive circuit in FIG. 1.

FIG. 2 is a preferred embodiment of the high-side drive circuit 100. The high-side drive circuit 100 is a differential-mode level-shift circuit. A pulse generation circuit 200 generates a pulse-on signal $X_P$ and a pulse-off signal $X_N$ in response to the rising edge and the falling edge of the switching signal $S_A$ respectively. Transistors 110 and 120 are coupled to receive the pulse-on signal $X_P$ and the pulse-off signal $X_N$ respectively. A resistor 150 is coupled between the voltage supply $V_F$ and the transistor 110, and another resistor 160 is coupled between the voltage supply $V_F$ and the transistor 120. The pulse-on signal $X_P$ and the pulse-off signal $X_N$ are utilized to switch the transistors 110 and 120 for generating a level-shift-on signal $W_P$ and a level-shift-off signal $W_N$, respectively. A comparison circuit 170 receives the level-shift-on signal $W_P$ and the level-shift-off signal $W_N$ for generating a set signal $S_S$ and a reset signal $S_R$ which are coupled to a flip-flop 180. The flip-flop 180 generates a high-side drive signal $S_H$ for driving the high-side transistor 10. The comparison circuit 170 and the flip-flop 180 are powered by the floating power $V_F$-$V_N$.

Figure 3:
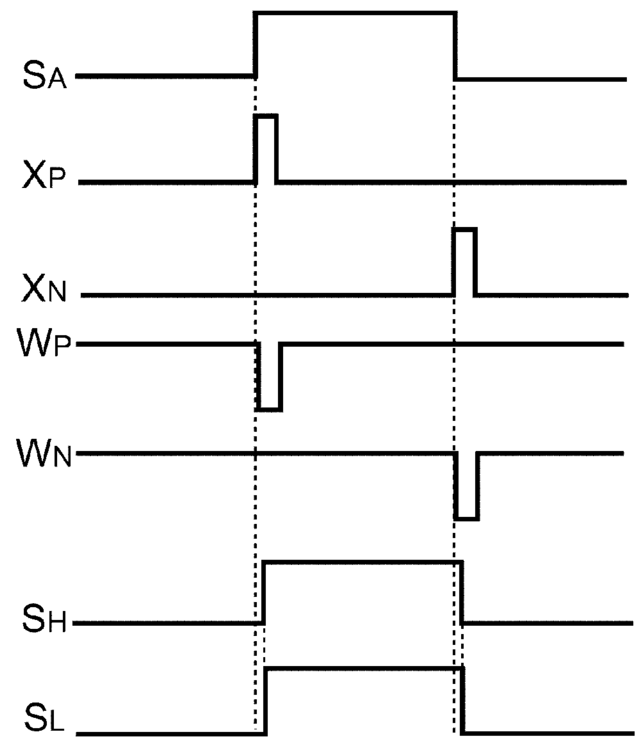
FIG. 3 shows key waveforms of the signals in FIGS. 1 and 2.

FIG. 3 shows key waveforms of the signals. Referring to FIG. 3, wherein the pulse-on signal $X_P$ and a pulse-off signal $X_N$ is generated in response to the rising edge and the falling edge of the switching signal $S_A$ respectively. The pulse width of the pulse-on signal $X_P$ and the pulse-off signal $X_N$ is shorter than 500 nsec. In response to the switching signal $S_A$, the high-side drive signal $S_H$ and a low-side drive signal $S_L$ are switched on/off simultaneously.

Figure 4:
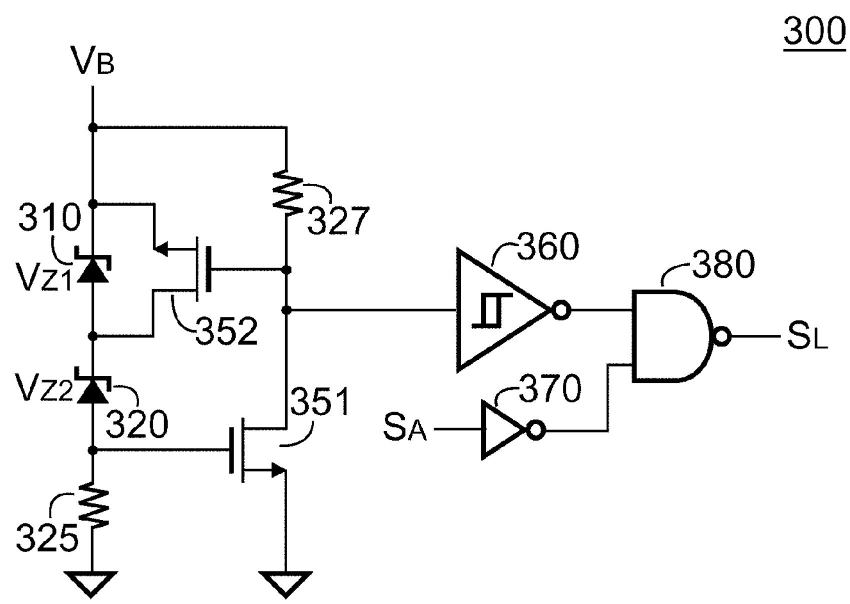
FIG. 4 shows an exemplary embodiment of the low-side drive circuit in FIG. 1.

FIG. 4 is a reference design of the low-side drive circuit 300. Zener diodes 310 and 320 are coupled in series between the power supply $V_B$ and a reference ground. The zener diodes 310 and 320 provide respective zener break-down voltages to form an operating threshold $V_{Z1}+V_{Z2}$. The zener diode 310 is coupled between a drain and a source of a transistor 352. The source of the transistor 352 is further coupled to the voltage supply $V_B$. A resistor 327 is coupled between the voltage supply $V_B$ and a gate of the transistor 352. The zener diode 320 is coupled between the drain of the transistor 352 and a gate of the transistor 351. A drain of the transistor 351 is coupled to the gate of the transistor 352, and a source thereof is coupled to the reference ground. A resistor 325 is coupled between the gate of the transistor 351 and the reference ground. An input terminal of an inverter 360 is coupled to the gate of the transistor 352 and the drain of the transistor 351, and an output terminal thereof is coupled to a first input terminal of an NAND gate 380. An input terminal of another inverter 370 is coupled to receive the switching signal $S_A$, and an output terminal thereof is coupled to a second input terminal of the NAND gate 380. Also referring to FIG. 5, when the power supply $V_B$ is lower than the operating threshold $V_{Z1}+V_{Z2}$, the inverter 360 will output a logic-low signal to enable the low-side drive signal $S_L$ via the NAND gate 380. The low-side drive signal $S_L$ will follow the switching signal $S_A$ via the inverter 370 after the power supply $V_B$ higher than the operating threshold $V_{Z1}+V_{Z2}$. Once the power supply $V_B$ is higher than the operating threshold $V_{Z1}+V_{Z2}$, the transistors 351 and 352 will be turned on and the operating threshold will be reduced to $V_{Z2}$.

Figure 5:
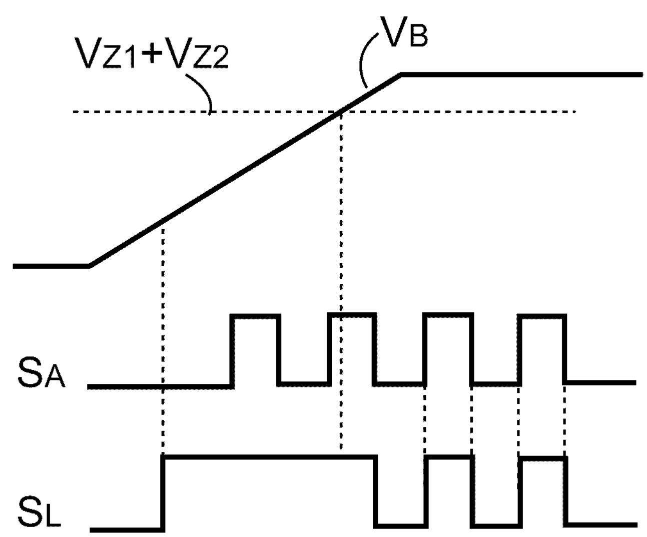
FIG. 5 shows waveforms of the power supply $V_B$, the switching signal $S_A$ and the low-side drive signal $S_L$ in FIG. 1.

FIG. 5 shows the waveform of the power supply $V_B$, the switching signal $S_A$ and the low-side drive signal $S_L$. Referring to FIG. 5, when the power supply $V_B$ is lower than the operating threshold $V_{Z1}+V_{Z2}$, the low-side drive signal $S_L$ is enabled. After the power supply $V_B$ higher than the operating threshold $V_{Z1}+V_{Z2}$, the low-side drive signal $S_L$ follows the switching signal $S_A$.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flyback power converter comprising:
- a transformer for power transfer;
- a high-side transistor and a low-side transistor coupled to switch said transformer;
- two diodes coupled to said transformer to circulate energy of leakage inductance of said transformer to an input power rail of said flyback power converter;
- a control circuit generating a switching signal coupled to control said high-side transistor and said low-side transistor; and
- a high-side drive circuit coupled to receive said switching signal for driving said high-side transistor;
- wherein said transformer has an auxiliary winding generating a floating power to provide a power supply for said high-side drive circuit.

2. The flyback power converter as claimed in claim 1 further comprising:
- a low-side drive circuit coupled to receive said switching signal for driving said low-side transistor;
- wherein said low-side drive circuit will turn on said low-side transistor before power supply of said low-side drive circuit reaches an operating threshold.

3. The flyback power converter as claimed in claim 2 further comprising:
- a floating capacitor for generating said floating power;
- a floating diode coupled from said auxiliary winding to said floating capacitor; and
- a bootstrap diode coupled from the power supply of said high-side drive circuit to said floating capacitor.

4. The flyback power converter as claimed in claim 2, wherein said high-side transistor and said low-side transistor are turned on/off simultaneously after the power supply of said low-side drive circuit reaches said operating threshold.

5. The flyback power converter as claimed in claim 1, wherein said high-side drive circuit is a differential-mode level-shift circuit.

6. The flyback power converter as claimed in claim 1, wherein said high-side drive circuit comprises:
- a pulse generation circuit generating a pulse-on signal and a pulse-off signal;
- two transistors coupled to receive said pulse-on signal and said pulse-off signal for generating a level-shift-on signal and a level-shift-off signal by switching on said transistors, respectively;
- a comparison circuit receiving said level-shift-on signal and said level-shift-off signal for generating a set signal and a reset signal; and
- a flip-flop generating a high-side drive signal for driving said high-side transistor;
- wherein said comparison circuit and said flip-flop are powered by said floating power.

7. The flyback power converter as claimed in claim 6, in which the pulse width of said pulse-on signal and said pulse-off signal is shorter than 500 nsec.

8. The flyback power converter as claimed in claim 1, further comprising:
- a low-side drive circuit coupled to receive said switching signal for driving said low-side transistor;
- wherein a low-side drive signal of the low-side drive circuit follows the switching signal when the power supply of said low-side drive circuit higher than an operating threshold.

* * * * *